United States Patent [19]
Chutuk

[11] Patent Number: 5,251,253
[45] Date of Patent: Oct. 5, 1993

[54] ALERT SYSTEM FOR HEARING IMPAIRED PERSONS

[76] Inventor: Mitchell C. Chutuk, 1200 Harbor Dr. N. U15C, Oceanside, Calif. 92054

[21] Appl. No.: 786,707

[22] Filed: Nov. 1, 1991

Related U.S. Application Data

[63] Continuation of Ser. No. 558,514, Dec. 6, 1983, abandoned.

[51] Int. Cl.[5] .................... H04M 11/00; H04M 11/08
[52] U.S. Cl. ...................................... 379/104; 379/102; 379/110
[58] Field of Search ............... 379/104, 102, 105, 110, 379/373, 93, 97, 98

[56] References Cited

U.S. PATENT DOCUMENTS

| | | | |
|---|---|---|---|
| 4,243,973 | 1/1981 | Sandidge | 379/102 |
| 4,425,477 | 1/1984 | Magil | 379/110 |
| 4,467,144 | 8/1984 | Wilkerson et al. | 379/102 |
| 4,653,087 | 3/1987 | Galich | 379/373 |
| 4,805,206 | 2/1989 | Beom-Chae | 379/102 |

Primary Examiner—James L. Dwyer
Assistant Examiner—Stella L. Woo

[57] ABSTRACT

An alert system and apparatus interrupts operation of sound producing entertainment devices and initiates an alerting device in connection with attracting the attention of hearing impaired persons. The present invention includes an input circuit connected to external actuators such as a doorbell, telephone, auxiliary alerting switches, etc., that externally and temporarily control the continuing operation of devices such as a radio, television, stereo, and actuates alert devices such as an audible device or light. Operably disposed between the input actuators and the external alerting devices is an electronic system consisting of interruption networks, consisting of isolated input processors, isolated time delays, and electronic gated controller with amplification, and a switching network to control the external alerting devices. When applicable, circuit isolation and rectifier networks intercouple between the external actuator inputs and time delays.

10 Claims, 7 Drawing Sheets

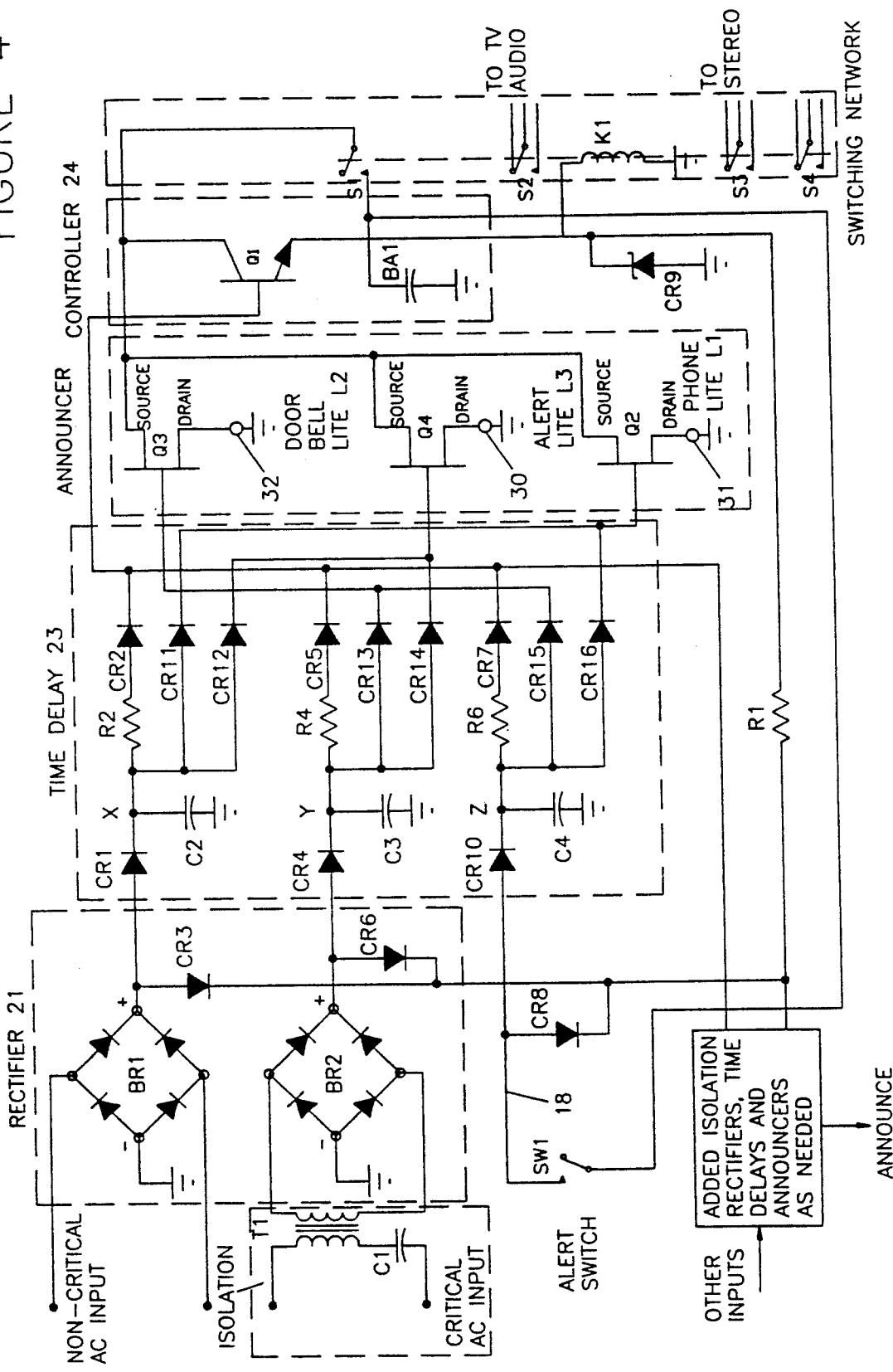

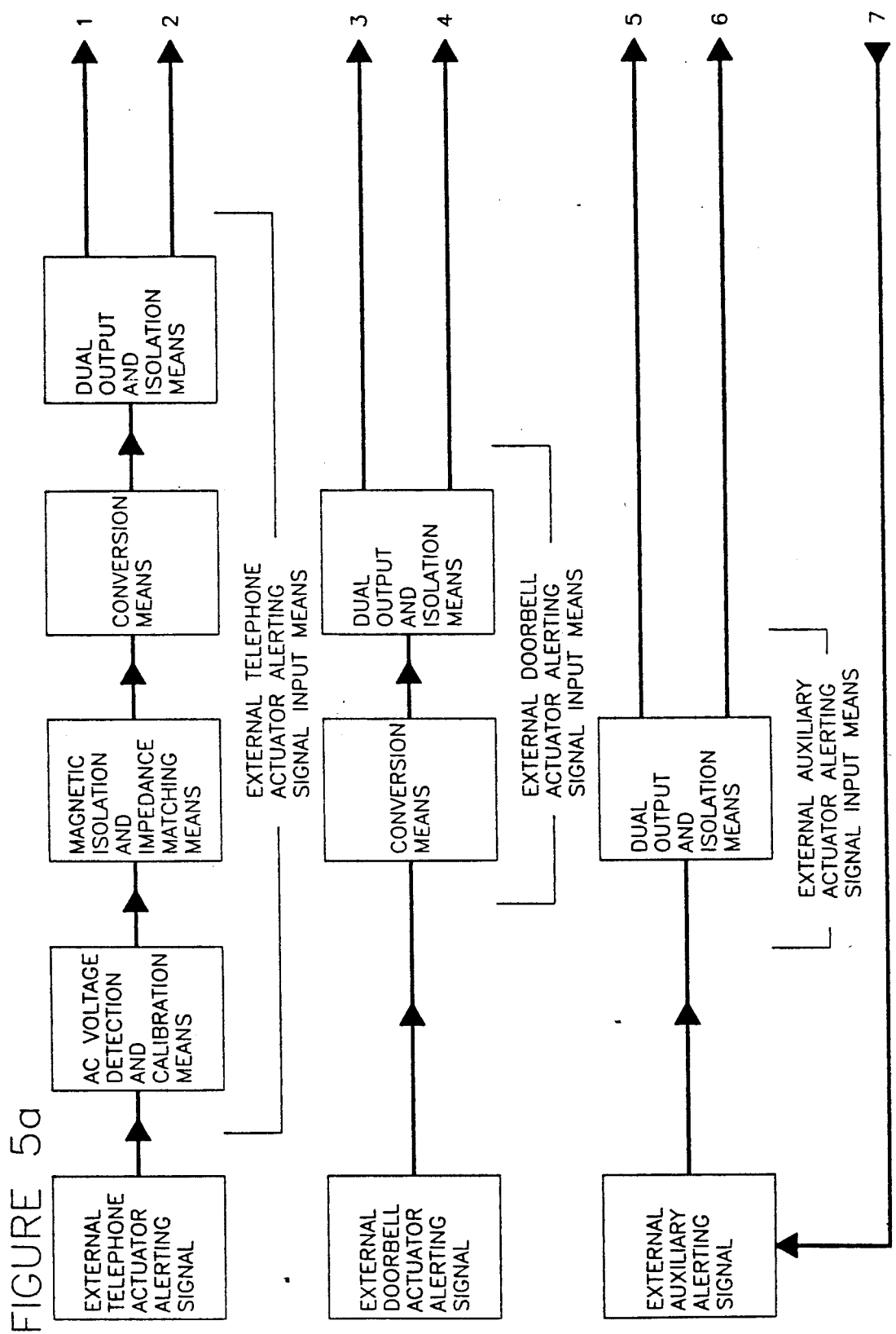

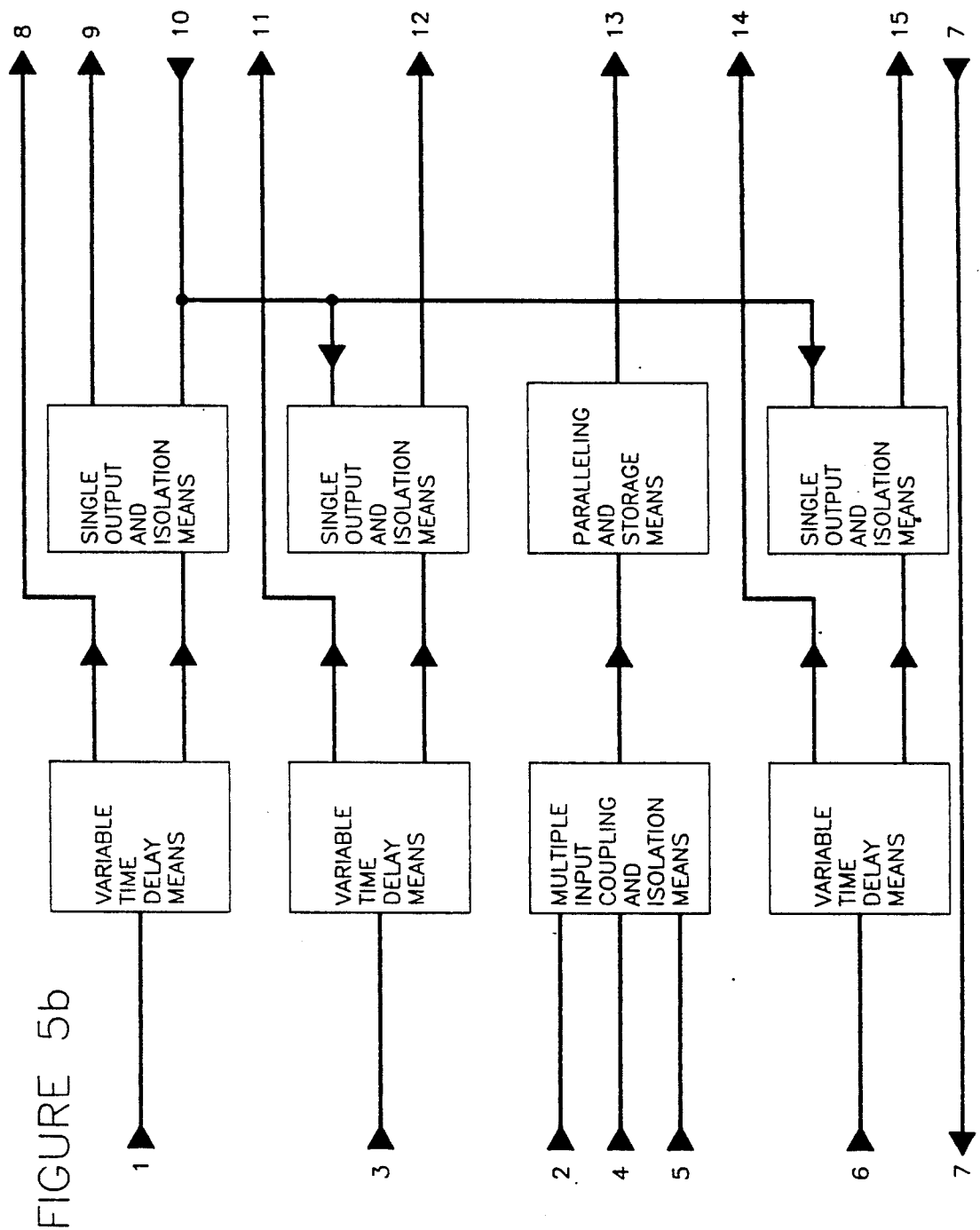

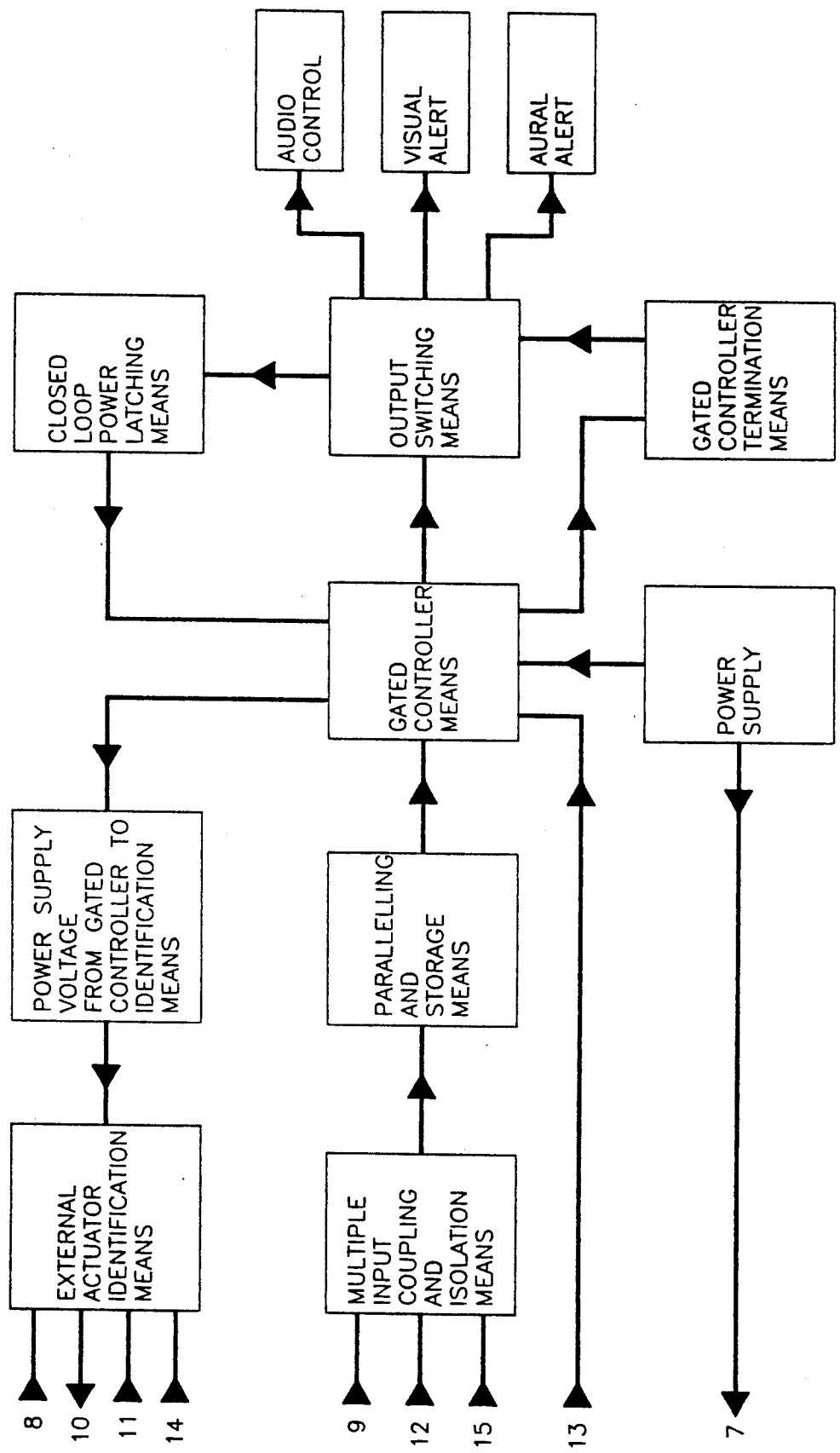

ALERT SYSTEM FOR HEARING IMPAIRED PERSONS

This application is a continuation of application Ser. No. 06/558,514, filed on Dec. 6, 1983, now abandoned.

BACKGROUND OF THE INVENTION

1. Field of the Invention

The present invention relates to alerting devices and systems and more particularly to a novel electronic aid for attracting the attention of hearing impaired persons, permitting interruption of operation of external sound producing entertainment devices, as well as initiating operation of visual and aural alerts, wherein such interruption and initiation of circuit operations is actuated by external input devices.

2. Brief Description of the Prior Art

It has been the conventional practice for residents and occupants of a dwelling to enjoy a variety of sound producing entertainment devices such as television, stereo, radios and the like, which involves listening to such devices at a raised audio level. Usually, the level is such that the residents or occupants with normal hearing enjoying the entertainment will still detect or sense overriding sounds such as the ringing of the telephone or a doorbell. However, problems and difficulties are encountered when persons have impaired hearing such that during the enjoyment of the entertainment, such persons are at a high risk of missing incoming telephone calls or visitors ringing the doorbell.

Also, when hearing impaired persons are at a location some distance from the ringing, such as in the backyard, or the entertainment devices are not in operation, they may be unable to hear either the doorbell or the telephone should one be actuated. Such persons are severely restricted in their enjoyment of such entertainment and outdoor activities, as well as indoors if the entertainment device is not in operation.

Therefore, a long standing need has existed to provide a system and apparatus for interrupting the audio output from such entertainment devices when a telephone or a doorbell rings. The system needed should include a means for operating an alert device such as a bell or light when the entertainment device may not be in operation or the person is at a location some distance from the doorbell or telephone ringing. In this manner, the hearing impaired person will be alerted to the fact that an attempt is being made to contact the person.

SUMMARY OF THE INVENTION

Accordingly, the above problems and difficulties are obviated by the present invention which provides a novel electronic means for interrupting the operation of sound entertainment devices and for initiating external alert devices so as to attract the attention of hearing impaired persons when external input actuator means are operated. In one form of the invention, the external input actuator means includes input circuits comprising a variety of actuators such as a doorbell, a telephone and an auxiliary operated hand switch, etc., that temporarily control the continuing operation of external output alert devices taking the form of radios, television, stereos and other audio producing electronic devices. Additional circuit means are provided for initiating external aural and visual signals in response to the operation of all external input actuators. In one form of the invention, output actuator means are provided which are operably connected to the attention attracting means via internal interruption circuits wherein the interruption circuits comprise interconnection of an input processing means for external actuator signals, an electronic gated controller, and an output actuator means for interconnection of external attention attracting means, and time delay means so that a pre-determined time delay permits a limited discontinuation of audio operation of selected attention attracting devices. Suitable internal isolation and rectifier means are provided where the external actuator inputs comprise alternating current with frequency phase relationships not compatible with the invention s electronic processing circuitry or other external input actuator signals. Where frequency phase relationships are not a consideration, the actuator input means consists only of rectification for conversion to direct current compatibility of the electronic circuitry.

Therefore, it is among the primary objectives of the present invention to provide a novel electronic alerting means for gaining the attention of hearing impaired persons by controlling external devices such as televisions and radios to have their sound interrupted by an electronic means for a specific time period thereby alerting the hearing impaired to the fact that an external input actuating means has been energized.

The present invention is not limited solely to controlling sound producing entertainment devices. Another objective is to provide a novel alerting means for the hearing impaired persons which will interrupt other than entertainment devices thus alerting such persons.

Still a further objective of the present invention is to provide the aforementioned novel system that further includes an actuating means for energizing additional forms of visual and aural alert means which are located external to the invention, providing alerts when the entertainment devices are not in operation, or when the hearing impaired persons are beyond the audible range of external input actuators.

Yet a further objective of the present invention is to provide a novel electronic means for hearing impaired persons that permits such persons to enjoy sound producing entertainment such as radios, televisions or the like, while alerting them to incoming phone calls, doorbell ringing and operation of a hand held switch located in another room.

Further, the present invention includes an indicator means to announce the external input means that is actuating the external output means alerting the hearing impaired persons.

BRIEF DESCRIPTION OF THE DRAWINGS

The features of the present invention, which are novel are set forth with particularity in the appended claims. The present invention, both as to its organization and manner of operation, together with further objects and advantages thereof, may best be undertaken by reference to the following description, taken in connection with the accompanying drawings in which:

FIG. 4 is a detailed circuit diagram of the alert system shown in block form in FIG. 2.

FIGS. 5a, 5b, 5c show a function diagram of the alert system, showing the integration of sub-circuits that provides the basis for claiming a new and different invention.

DESCRIPTION OF THE PREFERRED EMBODIMENT

Figure 1:
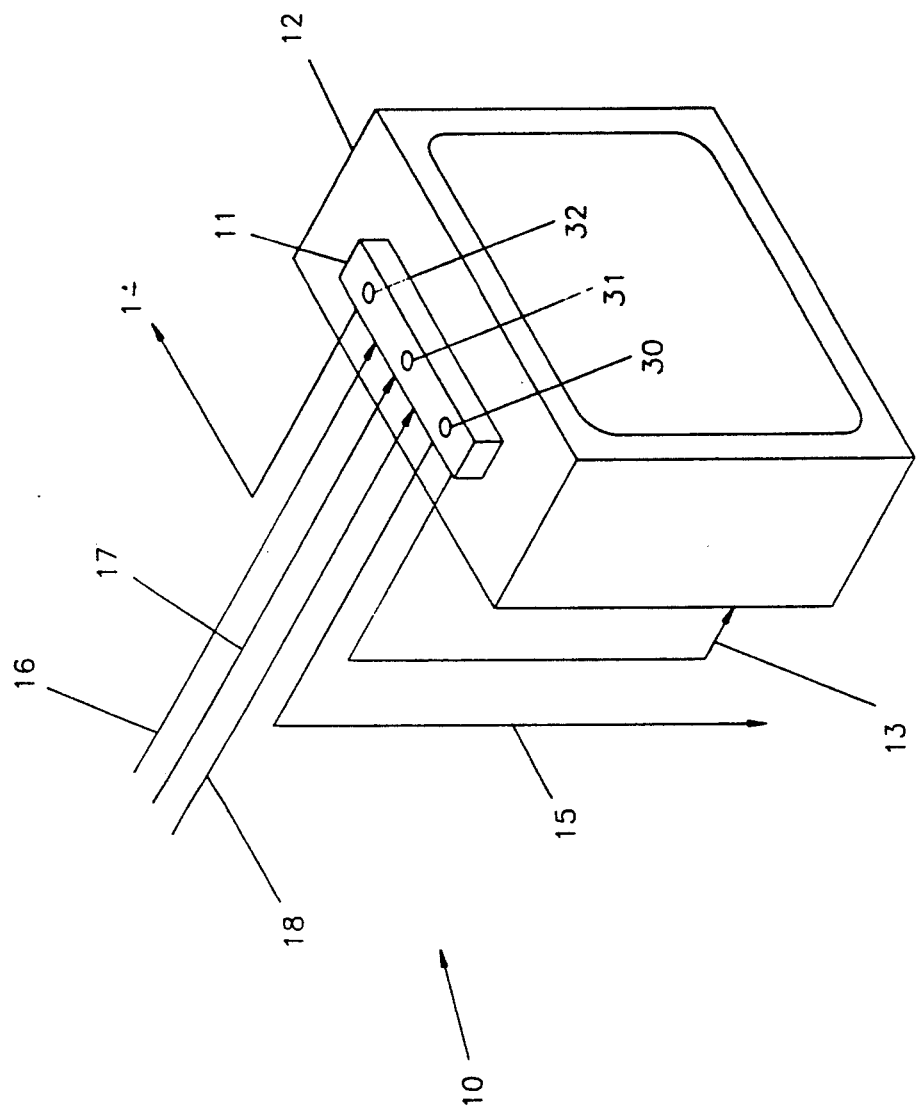
FIG. 1 is a perspective view of the novel apparatus of the present invention for aiding hearing impaired persons and illustrated in connection with a conventional television set.

Referring to FIG. 1, the novel electronic aid for hearing impaired persons is indicated in the general direction of arrow 10 which includes a housing 11 that is suitably placed on a controlled circuit device intended to have its operation interrupted such as for example, a television set 12. An output line from the circuit or network contained within the housing 11 comprises a cable 13 for TV control while other cables, such as cable 14, leads to a stereo system while a cable 15 leads to an external alert such as a yard bell. The various controlled circuits intended to have their operation interrupted or to initiate operation such as in the instance of the alert bell, are energized by external input actuators, taking the form of a conventional doorbell having input line 16 or a telephone along input line 17 or an external alert switch that is manually operated along input line 18. Therefore, the present invention is operative to interrupt audio operation of a stereo system or television or energize an alert bell whenever a telephone rings or a doorbell rings or a person at another location operates a switch. Thus, hearing impaired persons are alerted that an attempt is being made to make contact with the persons. Without such a device, the hearing impaired persons will have their attention directed towards the stereo or television and will not be alerted by the ringing of the doorbell or the ringing of the telephone.

Figure 2:
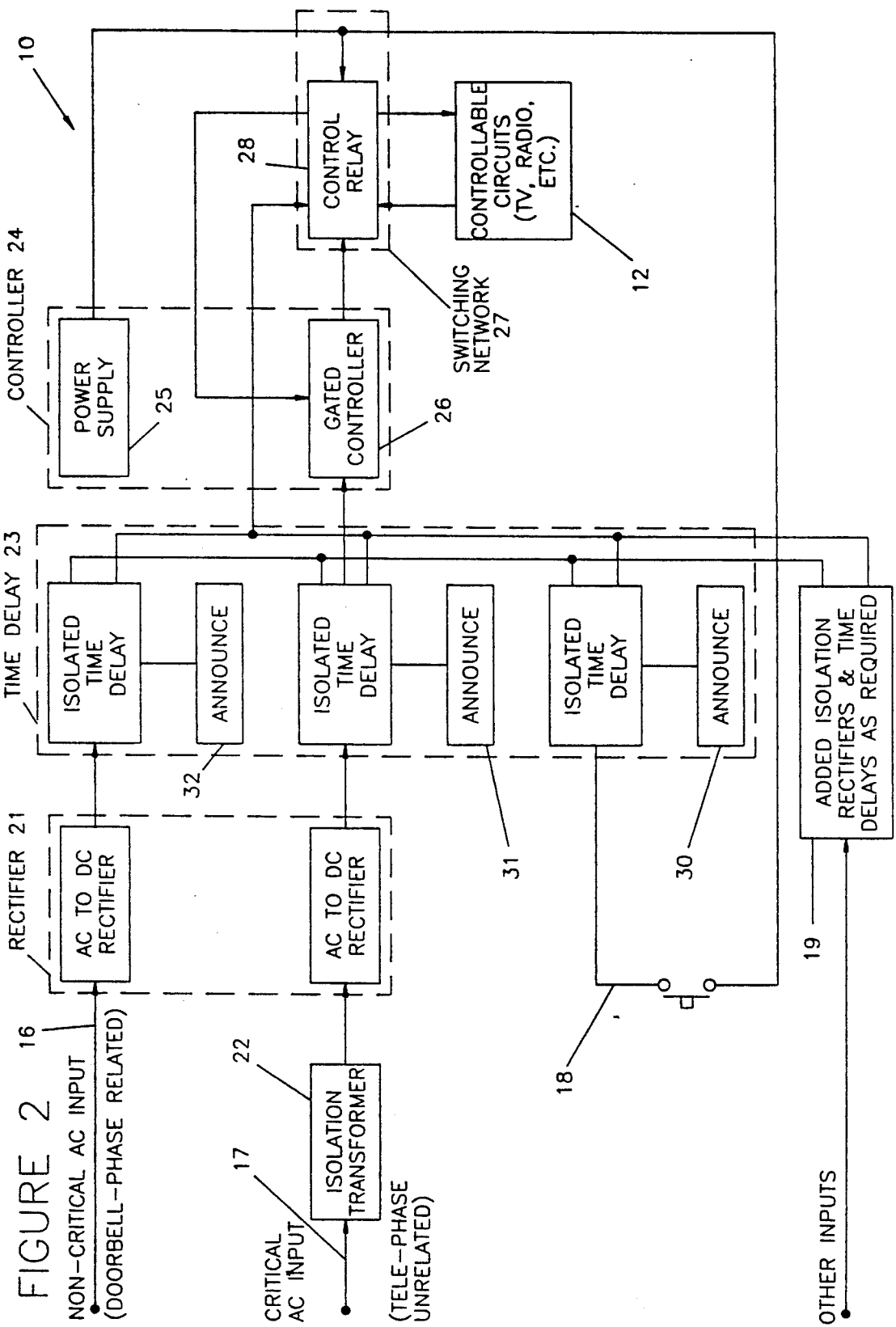
FIG. 2 is a block diagram illustrating the system employed in the alert system incorporated into the device shown in FIG. 1.

Referring now in detail to FIG. 2, a block diagram is provided illustrating the overall functional concept incorporating the present invention. By way of illustration, external input signals are received from three representative input actuators such as a doorbell along line 16 which represent an AC input whose AC frequency is not critical to any other phase present within the invention, a critical AC voltage such as a telephone ringing signal whose frequency is not phase related along input line 17, and auxiliary signalling from a distant location such as a bedridden person in another room, provided by an external switch SW1 along line 18. The alternating voltages are converted to DC voltages by rectifier circuits 21 with critical AC voltages protected from incompatible internal voltages by isolation network 22. Auxiliary signalling voltage is derived from the invention's power supply and returned as an external input via switch SW1. The respective outputs taking the form of DC signals from the rectifiers 21 and SW1 are individually applied to isolated time delay circuits 23. The outputs of the time delay circuits are isolated from each other and then applied in parallel to an electronic gated controller 24, comprising an amplifier 26 for amplification of signals received from the time delays, and power supply 25. If more than one external actuator input is received simultaneously, the one received fractionally before the others will be the active time delay input and the others will be stored. Upon completion of an active time delay, any stored time delay(s) will assume control of the system. The output of the electronic gated controller 24 is applied to a switching network 28 that may be either solid state or electromechanical design. The switching network 28 completes a variety of circuits connecting the internal power supply 25 to the electronic circuitry and maintaining the system powered as long as a time delay input voltage to amplifier 26 is maintained. Additional contacts in switching network 28 provide for the desired control of any number of external audios and external visual and aural alerts. The active DC voltage applied initially to time delay 23 is discharged by means of a base current supplied by the electronic amplifier 26. When the time delay voltage to controller 24 decays to a given level, the current supplied to the switching network causes network 28 to deenergize and the invention returns to a quiescent state. A unique feature of the foregoing sequence, and different from prior art, is that the external input actuator voltage is not used to power directly the output switching network or intermediate relay. The input voltage initiates system operation while the completion of the cycle is by means of the internal power supply.

Additional external input circuitry may be provided when other external actuator inputs are employed. Where AC phase may be critical, isolation similar to 22 is provided. Rectifiers and time delays are added to 21 and 23 respectively as needed. Such circuits are broadly represented by numeral 19 in which the outputs from the circuits are introduced in parallel to the controller 24.

Furthermore, it is to be noted that the inventive concept further includes the provision for visual identification means within assembly 11 to announce which of the external actuators is active in controlling the output switch network 28, using a plurality of lights as indicated in FIGS. 1 and 2 by numerals 30, 31, and 32. As an example, when the external actuator for the doorbell has been depressed to energize the circuits associated therewith, not only will the audios of the stereo, television, and other devices be interrupted but light 32 will illuminate identifying the source of the external input as the doorbell. Similar action results when other external actuators are utilized. It is to be understood that the indicator lights are not necessary to the present invention and are employed as a matter of choice.

Figure 3:
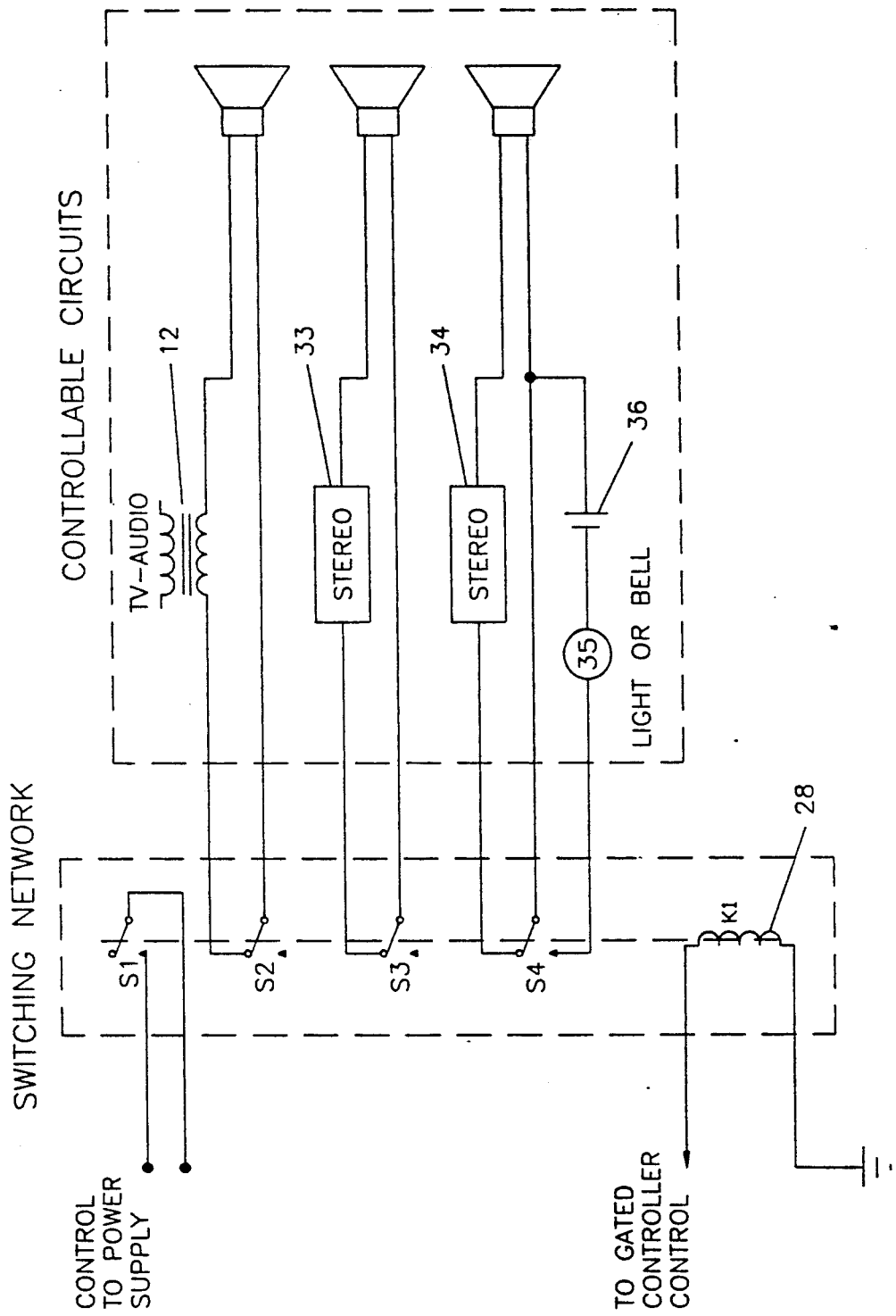
FIG. 3 is a diagrammatic illustration showing the controller for terminating operation of entertainment equipment as well as energizing of additional alert means.

Referring now to FIG. 3, an electromechanical relay is shown as the switching network 28. It can be seen that the audio of the television is interrupted when relay contacts S2 are opened and that the audios to the stereo sound system identified by numerals 33 and 34 are also interrupted by the opening of relay switch contacts S3 and S4. A set of contacts S1 of the switching network 28 completes the power supply voltage 25 as a latching loop keeping the electronic amplifier 26 and switching network 28 energized as long as an adequate input from an active time delay is maintained to gated controller 26 of FIG. 1. In addition to sound interruption, any set of contacts can have a dual function to operate a visual or aural alert at external locations as shown by battery 36 and alert device 35. Added relay contacts may be used as needed.

FIG. 3 shows a typical application wherein the audio of the television 12 and the audios of the stereo 33 and 34 are interrupted when a telephone rings or a doorbell is operated or an externally located switch is operated, thus gaining the attention of the hearing impaired persons either by loss of sound or by operation of a visual or aural alert. For the doorbell, it has been determined that 30 seconds is optimum as a caller will usually ring again within that time frame if there is no response. For the telephone, the time delay need only be sufficient for interruption and visual/aural alert between rings, usually two seconds. The audio will remain interrupted and the visual/aural alert maintained until the phone is answered or the caller terminates the call. The externally located alert switch SW1 can be held depressed for any length of time desired by the signaller with only a minor time delay used to compensate for inadvertent release of SW1. All of the foregoing time delays can be designed for the maximum anticipated time required and variable controls added to shorten the time of interruption and visual/aural alert as desired by the user.

Referring now in detail to FIG. 4, a typical circuit is illustrated. It will utilize a battery BA1 as power supply 25 and an electromechanical relay K1 as switching network 28. It will be described one channel at a time, starting with the external auxiliary alert system energized by switch SW1, followed by the non-critical frequency phase related AC doorbell input and then by the ringing of the AC telephone input that is critically phase related.

A two-wire input is supplied as part of the invention to accept an external actuator such as SW1 operated typically by a patient confined to a bedroom. When the switch is depressed, a voltage from BA1 is applied either momentarily or continuously to the junction of CR8 and CR10. Capacitor C4 is rapidly charged via CR10 due to the short time constant. The charge on C4 is in turn applied through resistor R6 and diode CR7 to the base of transistor Q1. Diodes CR2 and CR5 isolate the outputs of the other time delay channels and further isolate C4 from unwanted discharge into those channels. Simultaneously with the charging of C4, the input voltage from SW1 is applied through CR8 and resistor R1 to the K1 coil to initiate operation of relay K1. Diodes CR3 and CR6 isolate the inputs of the other time delay channels preventing parallel charging of those channels as time delays. When relay K1 operates in response to the voltage received via CR8 and R1 complete the circuit from BA1 to amplifier Q1 initiating collector and emitter current flow. The emitter current through the coil of K1 maintains the connection of BA1 to the collector thus forming a latched loop. When switch SW1 is released, K1 will remain latched as long as there is sufficient voltage from the time delay C4/R6/CR7 applied to the base of Q1. With the opening of SW1, C4 is no longer being charged and begins to discharge from the base current of Q1 as an exponential time delay, in turn causing a decrease in base and emitter current. CR8 isolates C4 from further charging if the voltage existing across the coil of K1 is higher than the charge on C4. CR10 isolates C4 from discharging through the coil of K1 if the voltage on C4 is higher than the voltage on the coil of K1. When the base current and emitter current decay to a level insufficient to maintain relay operation, K1 deenergizes and the opening of contacts S1 returns the system to its quiescent state. The values of C4 and R6 are chosen to provide the maximum time delay anticipated. If a lesser and variable time delay is desired, a potentiometer can be connected from point "Z" to ground thus accelerating the discharge of C4.

A typical external AC actuator that does not have critical frequency phase relationship is a doorbell voltage. If household AC is used for power supply 25 in lieu of an internal battery, there will be no phase incompatibility with the doorbell frequency. When AC voltage is applied from the external doorbell actuator, it is connected to a bridge rectifier BR1 for conversion to DC voltage. This DC voltage is in turn applied to the junction of CR1 and CR3. Capacitor C2 is rapidly charged via CR1 due to the short time constant. The charge on C2 is in turn applied through resistor R2 and CR2 to the base of transistor Q1. Diodes CR5 and CR7 isolate the outputs of the other time delay channels and further isolate C2 from unwanted discharge into those channels. Simultaneously with the charging of C2, the voltage from BR1 is applied via CR3 and resistor R1 to K1 coil to initiate operation of K1. Diodes CR6 and CR8 isolate the inputs of the other time delay channels preventing parallel charging of those channels as active time delays. When K1 operates in response to the voltage received via CR3 and R1, K1 contacts S1 complete the circuit from BA1 to amplifier Q1 initiating collector and emitter current. The emitter current through the coil of K1 maintains the connection of BA1 to the collector thus forming a latched loop. When the external doorbell actuator voltage ceases, and in turn the DC voltage from BR1, K1 remains latched to BA1 via contacts S1 as long as there is sufficient voltage from the time delay C2/R2/CR2 applied to the base of Q1. With the termination of AC voltage from the external actuator, and in turn the DC voltage from BR1, C2 is no longer being charged and begins to discharge from the base current of Q1 as an exponential time delay, in turn causing a decrease in base and emitter current. CR3 isolates C2 from further charging if the voltage existing across the coil of K1 is higher than the charge on C2. CR1 isolates C2 from discharging through the coil of K1 if the voltage on C4 is higher than the voltage on the coil of K1. When the base current and emitter current decay to a level insufficient to maintain relay operation, K1 deenergizes and the opening of contacts S1 returns the system to its quiescent state. The values of C2 and R2 are chosen to provide the maximum time delay anticipated. If a lesser and variable time delay is desired, a potentiometer can be connected from point "X" to ground thus accelerating the discharge of C2.

A critical external actuator is an input where the actuator has an AC frequency that may not be phase related to any AC voltages existing within the invention, such as use of household AC for a doorbell. Typical is the telephone ring voltage that varies from 20 to 70 hertz. To protect the telephone line as well as the internal components of the invention, an isolation transformer is used. Capacitor C1 and transformer T1 are a ring detector as well as a voltage scaling device and impedance matching between rectifier BR2 and the characteristic impedance of the external phone line. When the telephone rings, the composite DC and AC voltage from the telephone line is applied to C1 and T1, detecting the AC ring voltage. The detected AC voltage is coupled to rectifier BR2 for conversion to DC. This DC voltage is in turn applied to the junction of CR4 and CR6. Capacitor C3 is rapidly charged via CR4 due to the short time constant. The charge on C3 is in turn applied through resistor R4 and CR5 to the base of transistor Q1. Diodes CR2 and CR7 isolate the outputs of the other time delay channels and further isolate C3 from unwanted discharge into those channels. Simultaneously with the charging of C3, the voltage from BR2 is applied via CR6 and resistor R1 to K1 coil to initiate operation of K1. Diodes CR3 and CR8 isolate the inputs of the other time delay channels preventing parallel charging of those channels as active time delays. When K1 operates in response to the voltage received via CR6 and R1, one set of contacts S1 completes the circuit from BA1 to amplifier Q1 initiating collector and emitter current. The emitter current through the coil of K1 maintains the connection of BA1 to the collector thus forming a latched loop. When the external telephone actuator voltage ceases, and in turn the DC voltage from BR2, K1 remains latched to BA1 via contacts S1 as long as there is sufficient voltage from the time delay C3/R4/CR5 applied to the base of Q1. With the termination of AC voltage from the external actuator, and in turn the DC voltage from BR2, C3 is no longer being charged and begins to discharge from the base current of Q1 as an exponential time delay, in turn causing a decrease in base and emitter current. CR6 isolates C3 from further charging if the voltage existing across the coil of K1 is higher than the charge on C3. CR4 isolates C3 from discharging through the coil of K1 if the voltage on C3 is higher than the voltage on the coil of K1. When the base current and emitter current decay to a level insufficient to maintain relay operation, K1 relaxes and the opening of contacts S1 returns the system to its quiescent state. The values of C3 and R4 are chosen to provide the maximum time delay anticipated. If a lesser and variable time delay is desired, a potentiometer can be connected from point "Y" to ground thus accelerating the discharge of C3.

Operation of relay K1 not only provides the foregoing latched operation for a specified time period, K1 provides the desired end result of interruption of external audios and visual and aural alerts. As can be seen, the operation of K1 includes the opening of contacts S2, S3 and S4. Typically S2 interrupts the audio of the television when K1 is operated for the pre-determined time delay period. S3 and S4 may be for a two-speaker stereo system. Operation of aural and visual alerts has been discussed in describing FIG. 3. It is to be noted that the number of contacts for K1 is not limited to the four shown and that other control of external devices can be added. A primary difference in the present invention and prior electrical art, and the electronics system of Shaw, (U.S. Pat. No. 3,446,967) is that muting relays and networks need not be added to the television and stereos. The only modification needed is to remove one speaker wire and connect the two wires supplied as part of the invention to the speaker and to the wire removed from the speaker.

As a wide range of voltages may be expected from various external actuators, the coil of K1 must be protected from overdriving with excessive voltage. For that purpose, a small resistor R1 is added to the common wire from CR3, CR6 and CR8 to the coil of K1 and a zener diode CR9 is connected from the coil to ground. Any excess voltage from the inputs is dissipated across R1. The resistor-capacitor combinations of the time delays are not subject to such a constraint, with the values of the components chosen as an approximation of the expected voltage inputs.

The design of the electronic amplifier 26 is an emitter follower with degeneration to compensate for Beta variations of transistors.

The source of an external actuator input interrupting an external audio can be determined by hearing impaired persons using logic. As an example, a loss of television audio or observing a visual or aural, one can listen to determine if a phone is ringing, or alternatively lift the handset. If a dial tone is heard, then the alert is obviously the doorbell or a person actuating auxiliary switch SW1. The hearing impaired person would most likely first investigate the origin of switch SW1, if connected. However, the inventive concept includes a visual identification system of announcer lights. For each input channel, there is added a "P" channel field effect transistor. As an FET has little or no input current, the source applied to the input gate of the FET is not disturbed. When the contacts of SW1 are operated, the source terminals of Q2, Q3, and Q4 are connected to BA1 in addition to the collector of Q1 previously described. Each of the drains of the three FETs are connected via a colored light to ground. Each input gate of each FET connected by two diodes to two time delays. Typically, when an external input voltage is applied to a time delay, the output of the time delay is applied via the two isolating diodes to the unused channels, biasing them to zero conduction and preventing illumination of those unused channels. The FET for the active channel, not being connected to the active time delay, is in full conduction and the indicator announcer light illuminates. As an example, if the external doorbell actuator operates and charges time delay network C2 and R2, the voltage from C2 is applied via isolating diodes CR11 and CR12 to FETs Q2 and Q4 preventing illumination of announcer lights L1 and L3. As Q3 has no bias applied, it conducts and illuminates L2. Similar action occurs for the other channels. If simultaneous external inputs are received, all announcer lights will be extinguished. When the controlling channel has discharged to a level below the stored channel(s), a stored channel will begin discharging. When only one stored channel exists, the announcer light for that channel will illuminate, alerting the hearing impaired person that the final controlling channel is the last external input. If the isolating diodes CR11 and CR12 do not have sufficient reverse current between operations, a high ohm resistor can be connected from gate to ground for each FET. While the announcer lights will indicate alternate control of the electronic amplifier, there will be no effect on the control of external audios or visual and aural alerts; i.e., sound will remain off and the visual-aural alert will remain in operation until all time delays have discharged below the holding level of the latching circuitry. The lights may be color coded for identification: red for phone, yellow for doorbell, green for SW1, etc., or, an edge lighted panel with the words BELL, PHONE, and AUX can be used.

A significant difference in the present invention over prior electrical art is the use of electronic signal processing, isolation of multiple external inputs, isolation of the time delay outputs when they are paralleled for amplification, use of external actuator voltages to simultaneously initiate time delays and relay operation while using an internal power supply for discharge of the time delays and latching of the relay for pre-determined time periods, amplification of processed inputs and a system to identify the source of external inputs.

While particular embodiments of the present invention have been shown and described, it will be obvious to those skilled in the art that changes and modification may be made without departing from this invention in its broader aspects and, therefore, the aim in the appended claims is to cover all such changes and modifications as fall within the true spirit and scope of this invention. As an example:

The power supply 25 can alternatively be a rectifier using household AC voltage. A bridge rectifier with a series resistor and a zener voltage regulator for collector voltage of Q1 would then be used. One of the wires from the household voltage is routed via contacts S1 to maintain the latching action previously described.

What is claimed is:

1. An alert system for hearing impaired persons that provides muting of external and remote competing sound sources such as TV's, stereos, radios and other sound sources generated by electric and electronic devices, the muting being accomplished by an integrated design for processing signal devices such as ringing telephones, doorbells and auxiliary signal inputs, and actuates visual and aural alerts such as lights and bells, the system comprising:

an external telephone actuator alerting signal input means comprising an alternating current (AC) voltage detection and calibration means connected to a magnetic isolation and impedance matching means connected to a first voltage conversion means connected to a first dual output and isolation means;

an external doorbell actuator alerting signal input means comprising a second voltage conversion means connected to a second dual output and isolation means;

an external auxiliary actuator alerting signal input means comprising a third dual output and isolation means;

a first variable time delay means connected to said first dual output and isolation means;

a second variable time delay means connected to said second dual output and isolation means;

a third variable time delay means connected to said third dual output and isolation means;

a first single output and isolation means connected to said first variable time delay means;

a second single output and isolation means connected to said second variable time delay means;

a third single output and isolation means connected to said third variable time delay means;

a first multiple input coupling and isolation means connected to said first, second, and third dual output and isolation means;

a second multiple input coupling and isolation means connected to said first, second, and third single output and isolation means;

a first paralleling and storage means connected to said first multiple input coupling and isolation means;

a second paralleling and storage means connected to said second multiple input coupling and isolation means;

a gated controller means connected to said first and second paralleling and storage means;

an output switching means connected to said gated controller means;

a closed loop power latching means connected to said gated controller means and said output switching means;

a gated controller termination means connected to said gated controller means and said output switching means; and an external actuator identification means connected to said first, second, and third variable time delay means and to said first, second, and third single output and isolation means.

2. The alert system according to claim 1, wherein:

the AC voltage detection and calibration means provides detection of an AC ringing voltage from a composite AC and direct current of an external telephone actuator alerting signal and calibration of said AC ringing voltage to a level compatible with said alert system;

the magnetic isolation and impedance matching means provides isolated and non-wired coupling between said external telephone actuator alerting signal and subsequent active processing circuits and matches a 600 ohm impedance of said external telephone actuator alerting signal and a characteristic impedance of said alert system; and the first voltage conversion means provides a unidirectional signal.

3. The alert system according to claim 1, wherein the second voltage conversion means provides a unidirectional signal from an AC or DC external doorbell actuator alerting signal.

4. The alert system according to claim 1, wherein each of said first and second paralleling and storage means provides storage of excess inputs from said first multiple input coupling and isolation means if a plurality of inputs exists from more than one of said external actuator alerting signals.

5. The alert system according to claim 1, wherein each of said first, second, and third variable time delay means is designed for maximum time delay requirement with a variation control to reduce a time interval as desired.

6. The alert system according to claim 1, wherein the gated controller means comprises a degenerative configuration amplifier which is connected to said first and second paralleling and storage means and a standard DC power source.

7. The alert system according to claim 6, wherein said output switching means provides control of said external competing sound sources, audio alerts and visual alerts, and the DC power source.

8. The alert system according to claim 6, wherein said closed loop power latching means interlocks the DC power source upon termination of the output of said first multiple input coupling and isolation means.

9. The alert system according to claim 6, wherein said gated controller termination means senses a minimum operating voltage of said degenerative amplifier means and cancels said closed loop power latching means upon expiration of an active one of said first, second, and third variable time delay means.

10. The alert system according to claim 6, wherein the external identification means comprises field effect amplifiers, each of said field effect amplifiers being connected to said power source, each of said variable time delay means, and individual coded lights having illumination corresponding to an active external actuator alerting signal input means.

* * * * *